Patented Mar. 23, 1954

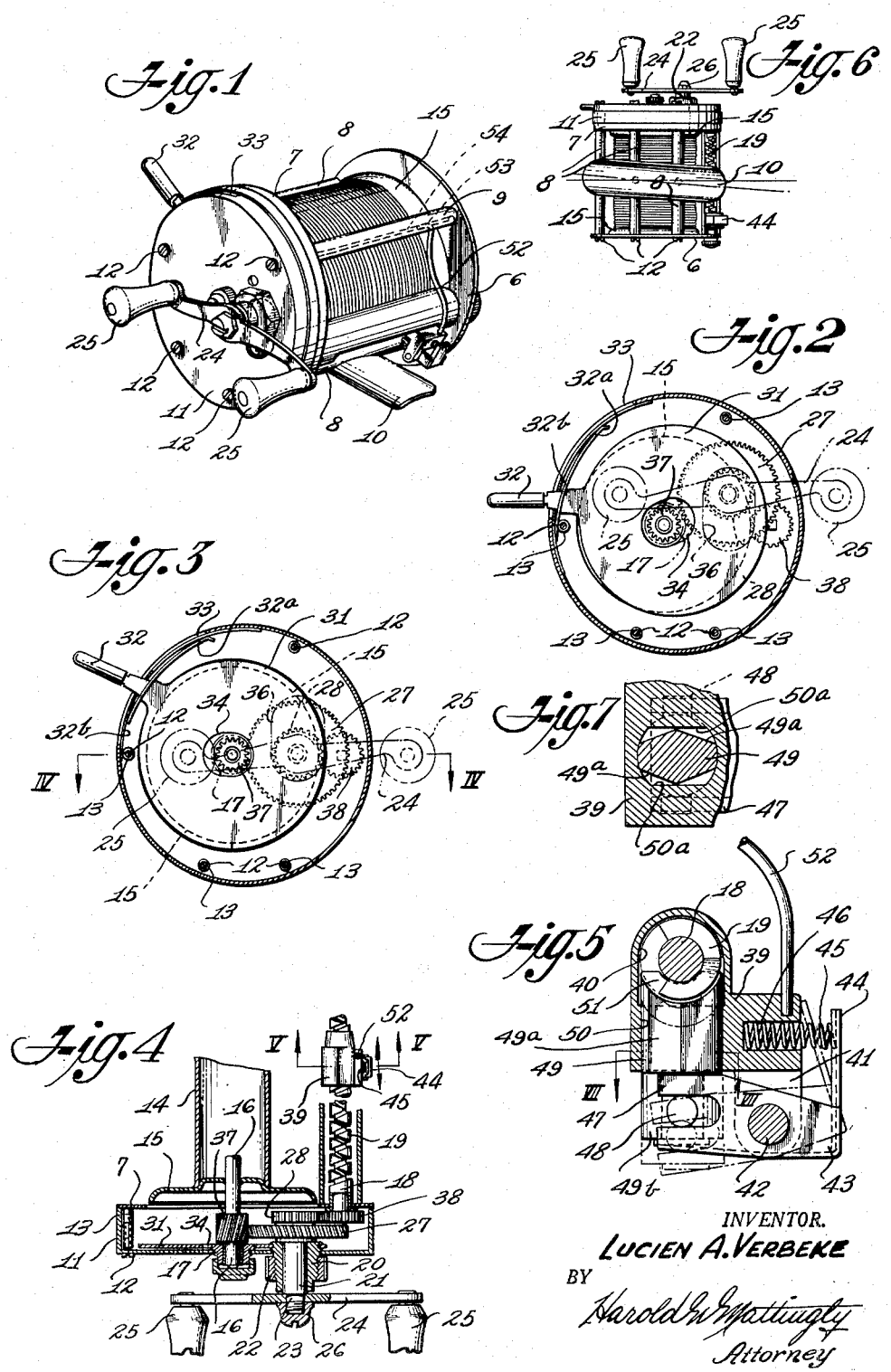

2,673,043

UNITED STATES PATENT OFFICE 2,673,043

LEVEL WIND BAIT CASTING REEL

Lucien A. Verbeke, Maywood, Calif.

Application September 30, 1949, Serial No. 118,797

3 Claims. (Cl. 242—84.4)

This invention relates to a fisherman's casting reel and more particularly to a free spool device for use in connection with a reel having a level wind thereon.

An object of the invention is to provide a reel wherein the operating handle can be disconnected from the spool and the level wind unit, the line guide of the level wind unit can be disconnected from its specific operating mechanism, and wherein the line guide is automatically re-engaged with its operating mechanism when the handle is again coupled with the spool and the level wind unit.

Another object of the invention is to provide a reel structure wherein the angular disposition of the reel mounting bracket or member is such that the axis of the reel spool is canted in such a way that line being wound upon the spool will lie properly against a single line guide rod, the single rod being provided to permit movement of the line guide to one side of the reel so that a free cast can be made without interference from the line guide.

These and other objects and advantages of the invention will more fully appear from the following description made in connection with the accompanying drawing wherein:

Fig. 1 is a perspective view of an embodiment of the invention;

Fig. 2 is a vertical transverse sectional view with the operating handle shown in dotted lines;

Fig. 3 is a view similar to Fig. 2 with the gear train and its control member in an alternate position;

Fig. 4 is a section taken approximately on the line 4—4 of Fig. 3;

Fig. 5 is an enlarged sectional detail taken approximately on the line 5—5 of Fig. 4;

Fig. 6 is a bottom plan view of the reel; and

Fig. 7 is a sectional detail taken approximately on the line 7—7 of Fig. 5.

The reel shown generally in Fig. 1 includes a pair of end plates 6 and 7 connected by spacers 8 and 9 in the usual manner. Suitably connected to the spacers 8 at the bottom of the reel is a reel frame mounting in the form of a tongue 10 which is concavo-convex in cross-section to fit the contour of a rod handle on which the reel is to be mounted.

As shown in Fig. 4, the end plate 7 has a gear housing 11 connected thereto by means of small screws 12 which extend through the outer face of the housing 11 and into outwardly disposed pillars 13 which are located on the outer face of the end plate 7.

Lying between the end plates 6 and 7 and within the cage formed by the spacers 8, is a spool 14 having enlarged ends 15 whose longitudinal axis extends between the end plates 6 and 7. A reel shaft 16 supports the spool ends 15. As shown in Fig. 4, one end of the shaft 16 is journaled in a bearing 17 which is pressed in the gear housing 11. The other end of the spool shaft 16 is suitably journaled in the end plate 6 in a manner well known in the art and considered unnecessary to illustrate here.

Extending between and journaled in the end plates 6 and 7 is a screw shaft 18 and a reverse screw thread 19 cut therein. The shaft 18 constitutes a portion of the drive mechanism for the level wind unit.

A crank bearing 20, which supports a crankshaft 21 is mounted upon a circular lever plate 31, extends through an oval aperture 36 in the side wall of the gear housing 11. Nut 22 is threaded on a portion of the bearing 20 to prevent said bearing 20, lever plate 31, gears 27—28 and crank assembly 24—25 from slipping into gear housing 11, and also keeps plate 31 in line with fulcrum bearing 17.

The inner end of the shaft 21 extends approximately across the width of the gear housing 11 and has a pair of gears 27 and 28 mounted thereon for rotation therewith.

The lever plate 31 has an outwardly extending handle portion 32 which passes through a slot 33 in the circumferential wall of the gear housing 11. Approximately at the center of the lever plate 31 is an oval aperture 34 which relatively closely fits about the reel shaft bearing 17. The handle 32 passes through a leaf spring 32a and thin curved tongue 32b. The spring 32a places a frictional drag on the handle and the lever plate 31 to hold them in a set position. The tongue 32b closes the slot 33 and travels with the handle 32 when it moves.

The bearing 20 which supports the crankshaft 21 is mounted upon the lever plate 31 and extends through the oval aperture 36 in the side wall of the gear housing 11.

The spool shaft 16 has a gear 37 mounted thereon for rotation therewith and normally meshed with the gear 27 on the crankshaft 21.

The level wind shaft 18 has a gear 38 thereon which is normally meshed with the smaller gear 28 on the crankshaft 21.

When the lever handle 32 is shifted from the position of Fig. 3 to that shown in Fig. 2, the crankshaft 21 will be shifted in the gear housing slot 36 and the crankshaft gears 21 and 28 will approximately simultaneously become disconnected from their respective cooperating gears 37 and 38 on the reel shaft 16 and the level wind shaft 18.

Slidably mounted on the level wind shaft 18 and more specifically along the reversely threaded portion thereof, is a block 39 having an aperture 40 therethrough to relatively closely fit the shaft 18. The lower portion of the block 39 is provided with a projection 41 through which extends a pivot pin 42. Mounted on the pivot pin is a lever 43 having an upward extension 44 against which an expansion spring 45 is adapted to bear. The spring 45 is located in a socket 46 in the side of the block 39.

The other end of the lever 43 is forked, as at 47, to lie at either side of a pin 48 which extends laterally from a plunger 49. This plunger is vertically slidable in a bore 50 which extends upwardly through the block 39 to communicate with the aperture 40 which receives the level wind shaft 18. The upper end of the plunger 49 is tapered as at 51 so that it will fit into the valleys of the screw 19. The lower portion 49b of the plunger 49 is swivelly connected to the upper portion thereof.

Fig. 7 shows a portion of the plunger 49 with beveled side faces 49a, which, in conjunction with parallel faces 50a of the bore 50, limit movement of the plunger about its longitudinal axis to an angle only slightly greater than that of the helix angle of the reverse threads in the screw 19. This prevents the plunger from crossing the threads when it is retracted, and it insures seating in the threads when the screw 19 is rotated.

Extending upwardly from the block 39 is a small rod 52 which comprises a line guide element for the level wind unit. It should be noted that the line guide rod 52 is not in the form of the usual closed loop, but is a single free contact element against which the fishing line bears, and is free of any confinement except a lateral pressure in one direction only.

The upper end of the line guide rod 52 has a crosshead 53 thereon and it is adapted to reciprocate in the reel frame spacer 9 which is tubular in structure and is provided with a lower elongated slot 54.

In Figs. 3 and 4 the reel is shown with the several gears meshed in their normal operating position. When the reel handle is rotated in a clockwise direction, the spool 14, 15 will be rotated in a counter-clockwise direction by reason of the meshed gears 27 and 37. At the same time the level wind shaft 18 will cause the level wind block 39 and the structure carried thereby to reciprocate along the shaft 18 and from one end of the reel spool to the other by reason of the reverse threading of said level wind shaft 18.

When a cast is made the lever handle 32 on the lever plate 31 is shifted in a counter-clockwise direction from the position of Fig. 3 to that of Fig. 2. The lever plate 31 will partially rotate about a fulcrum provided by the reel shaft bearing 17 which extends into the oval aperture 34 in the lever plate 31. This causes the crank shaft 21 to move with its supporting lever plate 31 within the limits provided by the oval slot 36 in the side wall of the gear housing 11 and also causes gears 27 and 28 on the crankshaft to move out of mesh with their respective complementary gears 37 and 38. As a result the spool 14, 15 can rotate with a free action and without the hindrance or drag of gears 27 and 28, the crankshaft 21, crank arm 24, and crank handles 25 when a cast is made. Furthermore, this free action of the spool eliminates the tendency to backlash since the spool is relieved of the inertia of gears 27 and 28 and the crank handle elements.

When the gears 27 and 28 are disconnected, as mentioned above, the level wind shaft 18 is similarly disconnected so that the level wind mechanism will not function. This permits line to feed freely from the spool without hindrance from the line guide 52.

As brought out above, the line guide 52 can be moved to one end of the level wind shaft 18 by actuating the lever 43 which is connected to the screw follower plunger 49, thereby withdrawing the follower or plunger from the threads 19 and permitting the block 39 and its supporting structure to be moved along the level wind shaft without rotating the shaft. When the gearing is in its disconnected position for casting, the level wind mechanism will not move and the line guide 52 will remain at the end of the shaft to which it has been shifted while the cast is made.

When the lever handle 32 is returned to the position of Fig. 3 preparatory to reeling line upon the spool, the gears will all become meshed. Rotation of the handle 24, 25 will rotate the spool and also the level wind shaft 18. At the beginning of the rotation of the shaft 18, if the thread follower or plunger 49 is resting upon a land between portions of the thread valleys 19, the follower will be pressed by the spring 45 into one of the thread portions upon partial rotation of said shaft 18 and the level wind will immediately begin to function.

In Fig. 6 the tongue-like bracket 10 which permits securing of the reel to a rod, is shown disposed at a slight angle to a plane extending transversely of the spool shaft 16 and normal thereto. This, of course, disposes the reel spool at an angle to the longitudinal axis of a rod upon which it is mounted and this biasing of the spool will cause the line to maintain contact with the side of the line guide rod 52 regardless of the directional movement of the line guide as it reciprocates in front of the spool. Not only does this permit freer movement of the line relative to the guide 52, but it also enables the line guide to be moved to a position at one side of the spool as described above in the casting position of the level wind assembly.

It will, of course, be understood that various changes can be made in the form, details, arrangement and proportions of the various parts without departing from the spirit of the invention.

I claim:

1. In a casting reel, a frame having a rotary spool carried thereby, a reversely threaded screw rotatably mounted on said frame with its rotational axis substantially parallel to that of said spool, a line guide slidably mounted on said screw for longitudinal movement relative thereto, a follower movably carried by said guide and engageable with said screw, a lever pivotally mounted on said guide and operatively engageable with said follower to effect movement thereof into and out of engagement with said screw, and spring means on said guide engageable with said lever for normally urging the same into operative engagement with said screw.

2. In a casting reel, a frame having a spool rotatably carried thereby, a level wind device on said frame and including a single line guide rod slidably associated with said frame for rectilinear reciprocation adjacent to and lengthwise of the spool, and a reel frame mounting member having its longitudinal axis disposed at an acute angle to a plane intersecting the spool and mounting member and lying normal to the longitudinal axis of the spool whereby when the reel is mounted on a rod, the spool is disposed at an acute angle relative thereto and the line being wound upon the reel is maintained in contact with the line guide rod regardless of the directional movement of the line guide rod as it reciprocates relative to the spool.

3. In a casting reel, a frame having a plurality of tubular spacers and a spool rotatably carried thereby, a level wind device on said frame and including a single line guide rod, one end of said rod having a cross-head fixedly secured thereto, one of the tubular spacers of the frame being longitudinally slotted so as to slidably receive the cross-head for longitudinal guiding movement, and a reel frame mounting member having its longitudinal axis disposed at an acute angle to a plane intersecting the spool and mounting member and lying normal to the longitudinal axis of the spool whereby when the reel is mounted on a rod, it is disposed at an acute angle relative thereto and the line being wound upon the reel is maintained in contact with the line guide rod regardless of the directional movement of the line guide as it reciprocates relative to the spool.

LUCIEN A. VERBEKE.

References Cited in the file of this patent

UNITED STATES PATENTS

| Number | Name | Date |
|---|---|---|
| 477,754 | Greason | June 28, 1892 |
| 1,038,203 | Ricketts | Sept. 10, 1912 |
| 1,282,990 | Upton et al. | Oct. 29, 1918 |
| 1,448,947 | Smith | Mar. 20, 1923 |
| 1,719,246 | Smith | July 2, 1929 |
| 1,875,467 | Knoerzer et al. | Sept. 6, 1932 |
| 1,964,965 | Smelser | July 3, 1934 |
| 2,149,413 | Balz et al. | Mar. 7, 1939 |
| 2,179,413 | Kolosso | Nov. 7, 1939 |
| 2,179,972 | Adams | Nov. 14, 1939 |
| 2,321,650 | Burdick | June 15, 1943 |
| 2,321,820 | Kachel | June 15, 1943 |
| 2,352,138 | Torrence | June 20, 1944 |
| 2,458,298 | Polevoy | Jan. 4, 1949 |
| 2,610,002 | Surber | Sept. 9, 1952 |

FOREIGN PATENTS

| Number | Country | Date |
|---|---|---|
| 828,000 | France | Feb. 2, 1938 |
| 671,216 | Germany | Feb. 2, 1939 |